United States Patent [19]

Nishimura

[11] 4,037,789

[45] July 26, 1977

[54] AEROSOL-PARTICLE DISPENSER

[76] Inventor: Shunji Nishimura, Rua Dr. Luiz Miranda No. 5, Pompeia, Estado de Sao Paulo, Brazil

[21] Appl. No.: 646,667

[22] Filed: Jan. 5, 1976

Related U.S. Application Data

[62] Division of Ser. No. 549,390, Feb. 12, 1975.

[30] Foreign Application Priority Data

Dec. 27, 1973 Brazil .................................. 010222
May 13, 1974 Brazil .................................. 03896

[51] Int. Cl.² ............................................. B05B 7/30
[52] U.S. Cl. ........................... 239/214.17; 239/214.25; 239/77
[58] Field of Search ............... 239/214.11, 77, 214.13, 239/214.17, 214.25; 251/207

[56] References Cited

U.S. PATENT DOCUMENTS

| 1,974,538 | 9/1934 | Johnston | 239/77 X |
| 2,738,226 | 3/1956 | Bals | 239/77 |
| 2,768,859 | 10/1956 | Patterson | 239/77 |
| 2,973,325 | 2/1961 | Barrows | 251/207 X |
| 3,138,328 | 6/1964 | Glasby | 239/77 |
| 3,558,100 | 1/1971 | Hulsey | 251/207 |

Primary Examiner—Evon C. Blunk
Assistant Examiner—Michael Mar
Attorney, Agent, or Firm—Michael J. Striker

[57] ABSTRACT

An aerosol-particle dispenser includes a support, a receptacle mounted on the support and adapted to contain a substance to be dispensed. An outlet pipe communicates with the receptacle and has an outlet nozzle in which a rotary agitating device or turbine is installed. A blower is mounted on the support and communicates with the interior of the outlet, and a compressor is also mounted on the support and communicates with the interior of the receptacle in order to furnish compressed gas to the same.

12 Claims, 8 Drawing Figures

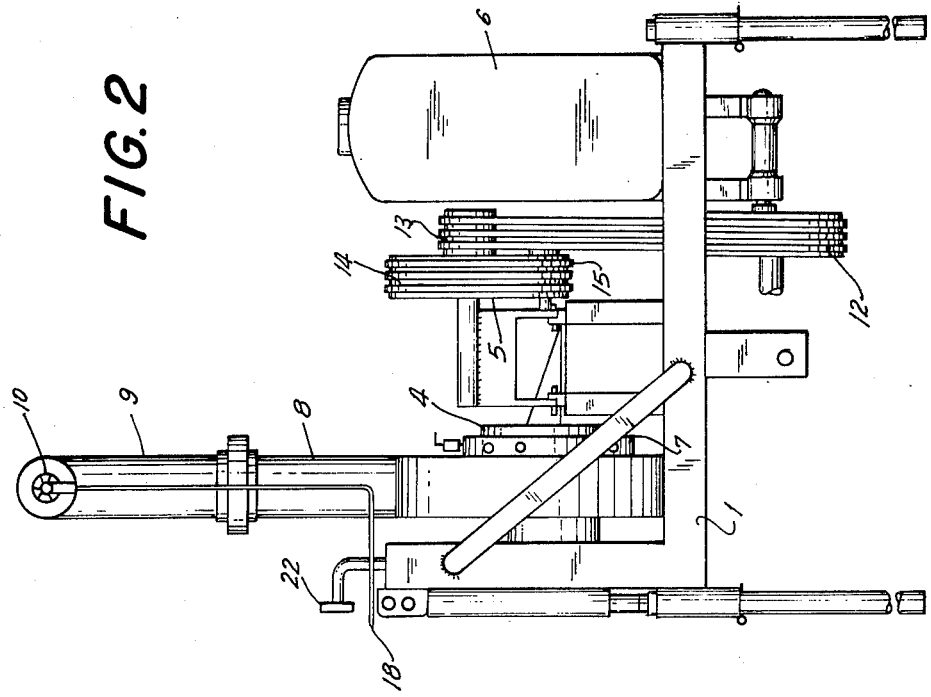
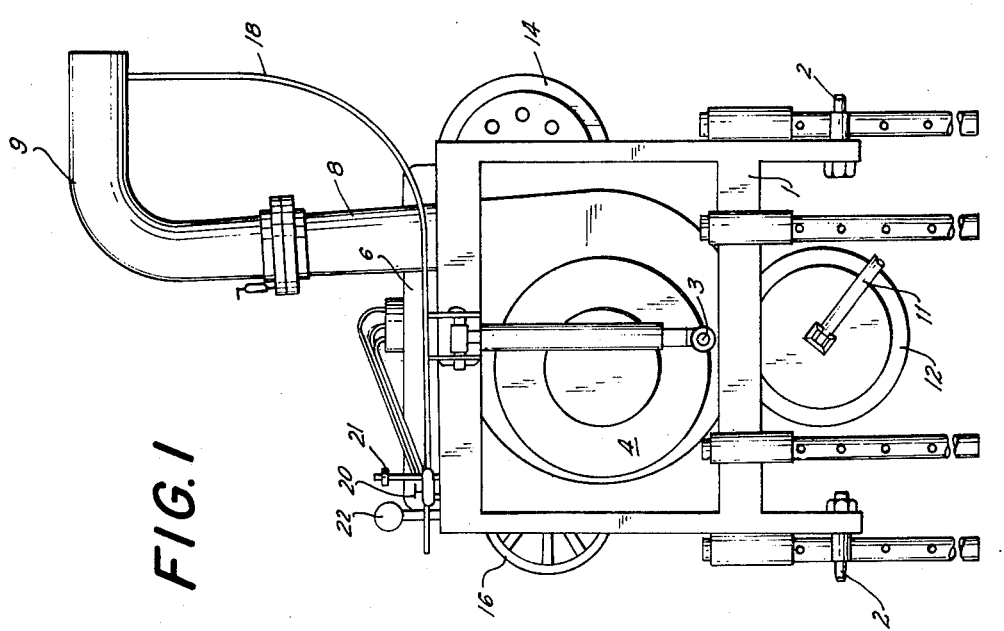

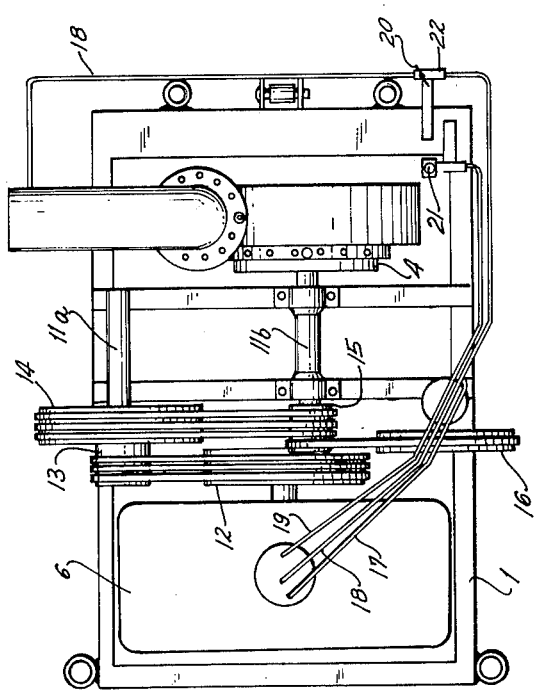
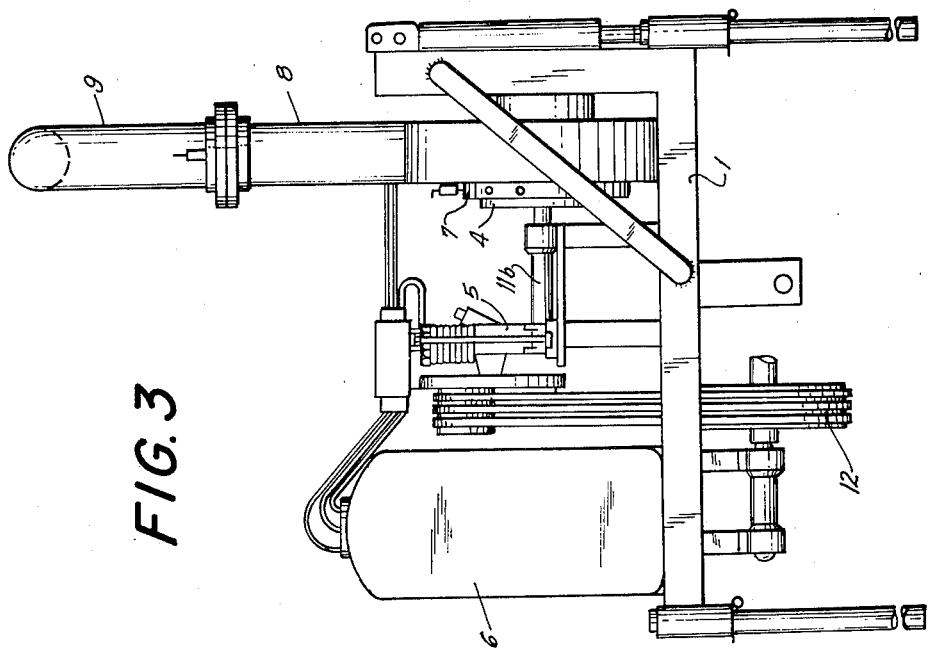

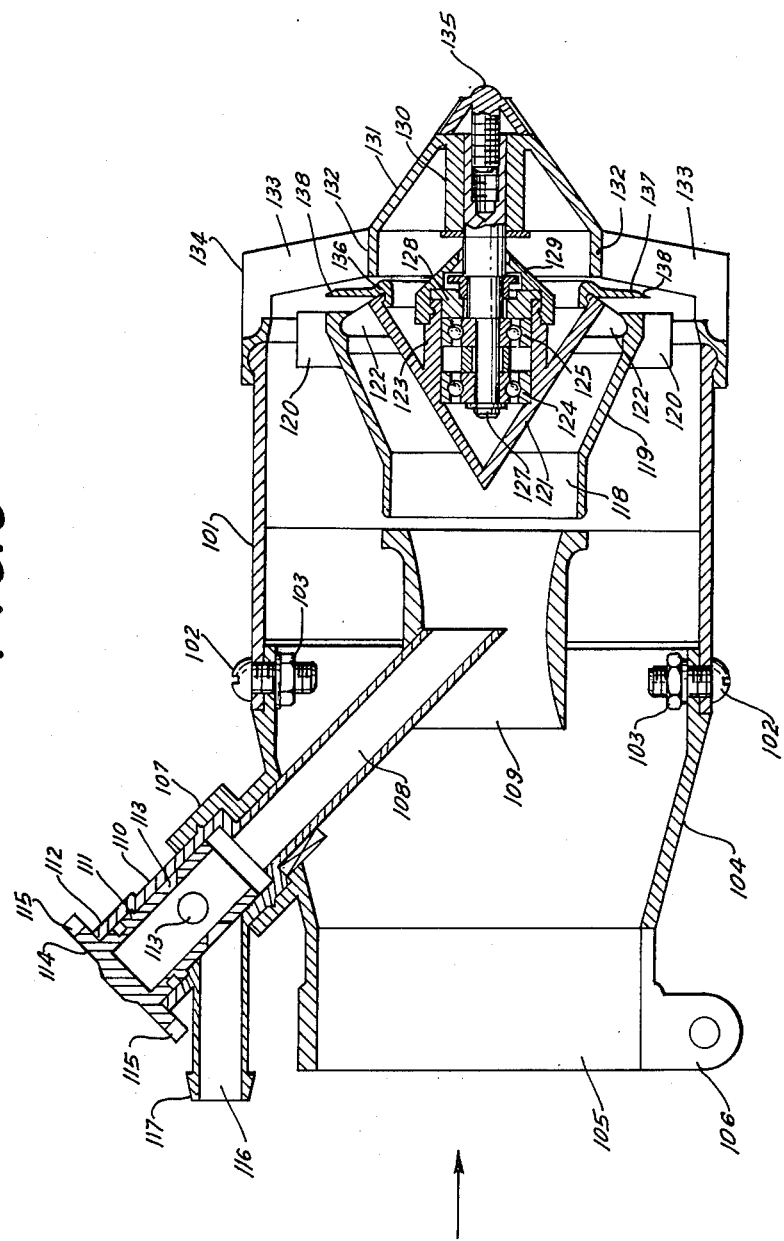

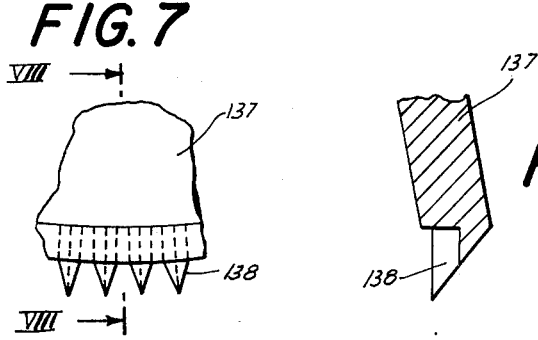
FIG. 7
FIG. 8
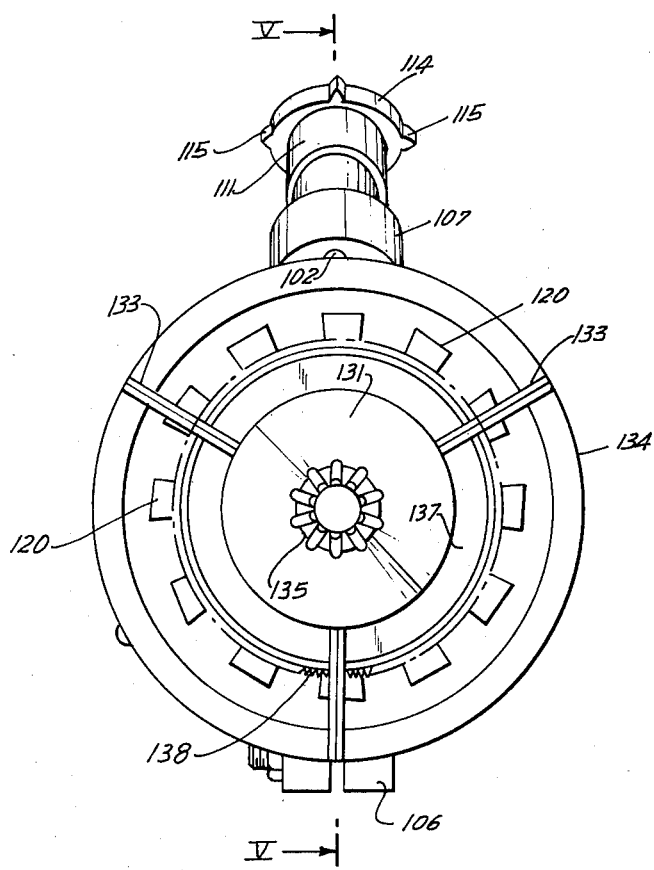
FIG. 6

AEROSOL-PARTICLE DISPENSER

This is a division of application Ser. No. 549,390, filed Feb. 12, 1975.

BACKGROUND OF THE INVENTION

The present invention relates generally to the dispensing of aerosol particles, and more particularly to an aerosol-particle dispenser and to a dispensing turbine.

There are many applications where particles of a substance must be dispensed to form an aerosol, for example insecticides, herbicides and fungicides, to name some examples. Such materials are widely used in agriculture. Their effectiveness is very frequently dependent upon the degree to which they can be dispersed in the air, and the density of particles that can be delivered per unit area of material to be treated, for example per square inch of leaf structure in a crop that is to be protected against insect attack. It is therefore desirable that when such materials be dispensed, they be dispensed in form of minute particles, and the smaller the particles and the more there are of them, the better will be the results obtained in terms of treatment of a crop or the like with the substance. On the other hand, such substances are usually relatively expensive, and are becoming more so, and it is therefore a further consideration in the design of dispensing equipment that the best possible coverage in terms of deposition of the particles on objects to be treated, be obtained with the least possible expenditure of substance.

SUMMARY OF THE INVENTION

Accordingly, it is an object of this invention to provide an improved aerosol-particle dispenser which avoids the disadvantages of the prior art and meets the aforementioned requirements.

Another object of the invention is to provide such an improved dispenser which is simple in its construction and operation.

Still a further object of the invention is to provide such a dispenser which can be readily moved and driven by a vehicle, such as a tractor or the like.

Still a further object of the invention is to provide an improved dispensing turbine for use in an aerosol-particle dispenser.

In keeping with these objects, and with others which will become apparent hereafter, one feature of the invention resides in an aerosol-particle dispenser, particularly for dispensing insecticides, herbicides and fungicides. This dispenser comprises, briefly stated, a support and a receptacle that is mounted on the support and is adapted to contain a substance which is to be dispensed as an aerosol. An outlet pipe communicates with the receptacle and has an outlet nozzle. Rotary agitating means is provided in the nozzle for agitating the substance and dispensing it as an aerosol. A blower is mounted on the support and communicates with the interior of the outlet pipe, and a compressor is also mounted on the support and communicates with the interior of the receptacle in order to furnish compressed gas to the same, so that the compressed gas enters the receptacle to expel the substance therefrom into the outlet pipe wherein the substance becomes agitated by the rotary agitating means prior to be dispensed as an aerosol.

The novel turbine for dispensing aerosol particles comprises, briefly stated, a tubular body forming a passage which has an inlet end for a stream of gas, and an outlet end. A venturi is mounted in the passage and has an extension which diverges in direction towards the outlet end. A hub is mounted on the tubular body within the extension and defines with an inner circumferential wall surface thereof an annular clearance. A shaft is journalled for rotation in the hub and carries a plurality of angularly spaced blades which are located in the clearance for rotation therein. A tubular injector unit extends into the tubular body and has an open end positioned to discharge into the venturi; this unit has an outer turnable end portion exteriorly of the tubular body and provided with angularly spaced openings of different cross-sectional areas. A housing surrounds the outer end portion, and a nipple communicates with the housing and is adapted for connection to a source of substance that is to be dispensed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a front-elevational view of a dispenser according to the present invention;

FIG. 2 is a side view of FIG. 1, looking towards the left;

FIG. 3 is another side view of FIG. 1, looking towards the right;

FIG. 4 is a top-plan view of FIG. 1;

FIG. 5 is an axial section through a turbine according to the present invention, taken on line V—V of FIG. 6;

FIG. 6 is a front view of the turbine in FIG. 5, looking towards the left;

FIG. 7 is a front-elevational view showing a detail of a component in FIG. 5; and FIG. 8 is a section taken on line VIII-VIII of FIG. 7.

DESCRIPTION OF THE PREFERRED EMBODIMENTS

Referring now to the drawing in detail, and firstly to the embodiment of the dispenser as shown by way of example in FIGS. 1-4, it will be seen that reference numeral I identifies a frame or chassis, i.e. a support. This support may be provided with wheels (not shown) so that it can be towed by a tractor (not shown). To connect the support 1 with this tractor the support is provided with a three-point hitch having two lateral connecting portions 2 and a central connecting portion 3.

Mounted on the frame 1 are an air blower 4, a compressor 5 and a reservoir 6 in which the substance to be dispensed, e.g. an insecticide, an herbicide or a fungicide, is to be accommodated. The air blower 4 has a domed cover 7 and is provided with an arcuate conduit 8 that is coupled with an outlet pipe or tubular nozzle 9 having in the illustrated embodiment the shape of an elbow or of a letter L. The nozzle 9 is mounted on the outlet pipe 8 so that it can be turned, preferably through 360°, about the longitudinal axis of the pipe 8. Mounted within the free open end of the nozzle 9 is a highspeed rotary turbine 10 having adjustable blades which serves to distribute and disperse the substance in question.

Reference numeral 11 identifies a shaft which is mounted via a universal joint and whose free end (not shown) may be coupled with the power take-off of the tractor, so that the shaft 11 will be turned by the tractor. The shaft 11 in turn is coupled with a pulley 12 that is mounted on the frame 1 and which transmits motion via belts or analogous devices to a coaxial pair of pulleys 13, 14 which are mounted on a shaft 11a for joint rotation. The larger one is a reducing pulley 14 and transmits rotation via a belt or the like to a pulley 15 that is mounted on a shaft 11b coaxially with the air blower 4. Again by means of bolts or the like, motion is transmitted from the pulley 15 to a further pulley 16 which drives the compressor 5.

The top of the reservoir 6 is provided with a removable cover to which there is connected an air tube 17 which communicates with the compressor 5, a material discharge tube 18 which communicates with the interior of the nozzle 9 in the region of the turbine 10 (compare FIGS. 1 and 2), and a tube 19 which conducts air to a pressure regulating valve 21 that is coupled with a pressure indicating gauge 22. The tube 18 has interposed in it a valve 20 which is manually operable.

When motion is supplied via the shaft 11, the air blower 4 and the compressor 5 will both be operated. The air blower 4, being arranged to communicate with the interior of the pipe 8, blows a stream of air through the pipe 8 and the nozzle 9, and this stream of air impinges upon the blades of the turbine to rotate the latter. The compressor 5 compresses air and supplies it via the tube 17 into the reservoir 6 where the air entrains and expels the substance contained therein, for example an insecticide powder. This substance then travels through the tube 18 to be delivered to the turbine 10 which agitates and entrains it, and expels it in form of minute droplets or particles (depending upon whether the substance is solid or liquid). If droplets are involved, their diameter depends upon the speed of the airflow and the speed of rotation of the turbine 10; the latter speed may be rotated by adjusting the adjustable blades of the turbine. The air pressure and flow can be controlled by means of the valves 20 and 21, in dependence upon the indication provided by the gauge 22. This is an important factor since each different pressure level in the reservoir 6 will correspond to a different output of substance per unit time, so that the output can be very precisely regulated with the device according to the present invention. It is possible to supply the dispenser together with a table indicating the ratio between these two valves that is the pressure and the corresponding output per unit time. This makes it very simple for an operator to determine for what pressure to set the equipment, since he checks the desired output per unit time on his table and from there obtains the pressure setting that is to be selected by operation of the valve 21 and which can be controlled by considering the gauge 22. Experience has shown that insecticides applied with prior-art equipment are usually dispensed at a rate of about 150 to 200 liters per hectare of land, depending upon the shape of the plates, the chemical specifications and the type of crop to be treated. The present invention makes it possible, due to the finer distribution of the dispensed substance, to utilize approximately 3 to 4 liters of substance per hectare. The dispenser of FIGS. 1-4 permits an area of about 16 hectares to be adequately covered with a spray of aerosol particles per hour, so that —assuming a 5 hour shift of use —it can treat 80 hectares per day. The turbine 10 will produce particles of approximately 10-15 micron size in the stream of material which issues from the nozzle 9, and experiments have shown that a sprayed crop area will have an average deposit of 20 droplets per square centimeter on the surface of the crop leaves, which is excellent result.

FIGS. 5-8 show a dispensing turbine for the type of material here in question. This turbine may replace the rotary turbine 10 of FIGS. 1-4, or, of course it may be used in some other type of dispenser different from the one illustrated in FIGS. 1-4.

It is well known that the rupture of the surface tension of droplets of dispensed aerosols, e.g. liquid insecticides, herbicides or fungicides, to name some examples, so that a protective deposition may be obtained on the surfaces of leaves of a crop or the like, is a considerable problem. Various prior-art proposals have been made in terms of dispensing equipment producing small droplets of aerosols when such substances are dispensed. However, for various reasons these prior-art proposals have not attained a satisfactory solution to the problem. On the one hand, many of them do not offer a uniform distribution of particles so that the cloud of particles which issues from the equipment cannot—due to the non-uniformity and undesirably large particle size— travel the desired distance and become deposited on the leaf surfaces with the necessary intensity that is required to obtain a proper covering and complete protection of the plants.

The turbine according to FIGS. 5—8 overcomes these difficulties, producing an aerosol cloud of uniform distribution and extremely small particle size, thus assuring that the cloud can travel a considerable distance from the dispenser and that sufficient droplets of the cloud will become deposited per unit area of leaf surface to be protected, to assure that insects or fungi will be reliably controlled. Of course, the same applies if a herbicide is used.

In FIGS. 5-8, reference numeral 101 identifies a central tubular body of substantially cylindrical shape; to one end of the tubular body 101 there is secured, here by means of bolts 102 and nuts 103, a truncated tubular body 104 having a cylindrical inlet 105 for the entry of a stream of air; one or more mounting lugs 106 are provided to mount the bodies 101 and 104 in place so that an air supplying hose or the like (not shown) can be connected with the inlet 105. A cylindrical socket 107 is provided in the body 104, advantageously of one piece with the same, and through this socket 107 extends an injector tube 108 the inner outlet end of which projects into a venturi 109 that is mounted in the interior of the bodies 101, 104. Outside the socket 107 the injector tube 108 has a portion 110 forming a receptacle or housing in which there is located a tube 111 that is retained in the housing 110 by a retaining ring 112 and is provided with circumferentially spaced openings 113 of different cross-sectional areas. An engaging portion 114 of the tube 111 is accessible exteriorly of the housing 110 and provided with a plurality of wings or projections 115 for engagement with the fingers of a user. By turning the portion 114, differently-dimensioned ones of the openings 113 can be placed into registry with a cutout in the housing 110, which cutout communicates with the interior 116 of a nipple 117 that is mounted on the housing 110 (or as one piece with the same) and which is to be connected (in a manner not illustrated, such as e.g. by a flexible hose or the like) with a source of material to be dispensed, for example an insecticide. This hose or the like communicating with the nipple 17 would thus be analogous to the tube 17 in FIGS. 1–4.

The venturi 109 has an outlet opening which coincides with the inlet 118 of a truncated central tubular body 119 which is provided at its end remote from the venturi 109 with a plurality of angularly spaced struts 120. Air flowing past the struts 120 becomes turbulent. Mounted within the part 119, which is in effect an extension of the venturi 109, is a conical hub 121 which extends to the open end of the extension 119 and there carries a plurality of blades 122 which are of substantially triangular profile. The member 121 may also be considered an inner hub rotates when a stream of air flows through the venturi 109 and impinges upon the blades 122 which for this purpose are set in the manner of turbine blades to extend at an angle to the direction of air flow. To make such rotation possible the inner hub 121 is mounted by means of two antifriction bearings 124 and 125 that are accommodated in a tubular portion 123 of the inner hub 121 and are spaced from one another by a spacing sleeve 126, on a shaft 127 the outer end of which is mounted in an outer hub 130 that is secured by means of a cover 131 to the mounting struts 133 whose end portions 134 secured to the tubular body 101, leaving between themselves free spaces (compare FIG. 6) for the passage of a stream of air and entrained particles. The shaft 127 is protected against axial shifting by a cover 128 which is maintained in place by a truncated conical member 129. The open end of the bore in the outer hub 130 in which the shaft 127 is mounted, is closed by an end cap 135. The end cap 135 is threaded in place to prevent dirt and contaminants from gaining access to the portion of the shaft 127 that is mounted in the outer hub 130.

Mounted at the right-hand end of the inner hub 121, secured thereto via an annular portion 136, is an annular member of generally disc-shaped configuration that is identified with reference numeral 137 and has a central opening which surrounds the portion 123 and the cover 129. Its outer marginal zone is provided with a plurality of serrations or teeth 138 (compare FIGS. 7 and 8) and forms a gap with the open right-hand end of the extension 119, being axially spaced from but axially opposite to the clearance in which the wings or blades 122 are located. The purpose of the serrations 138 is to serve an uniformizing element for the subdivided aerosol particles in a second stage, by means of the blades 122.

In operation, a user will select the amount of insecticide or other substance to be dispensed per unit time by turning the engaging portion 114 until an opening 113 having the desired cross-sectional area is located opposite to and communicates with the interior 116 of the nipple 117. Air is then admitted into the inlet 105 and insecticide or another substance is admitted into the nipple 117. The substance can be admitted under pressure, or it may be possible to rely upon the suction effect created by the flow of air through the venturi 109 past the inner end of the injector tube 108, which suction effect would be propagated through the openings 113 and the nipple 117 to the source of the substance, for example a reservoir such as the reservoir 6 in FIGS. 1–4. In any case, the insecticide or the like is injected into the venturi 109 and due to the turbulent air flow to which it is exposed it undergoes a prime division into particles or droplets. It then travels to the outlet 118 of the inner hub 121 which rotates due to the impingement of the air stream upon its blades 122, and as the already subdivided liquid substance travels through the spaces between the blades 122, its droplets are divided even more finely. However, it does not obtain at this time the desired uniformity of distribution. This takes place only as the cloud of particles subsequently travels through the gap between the right-hand open end of the extension 119 and the annular member 137, where the serrations 138 over which it must pass promotes still a further subdivision into even smaller particles and obtain uniformization of the particles so that the latter issue as a cloud which is entrained by the air that travels through the tubular body 101 and leaves the latter through the spaces between the struts 133, where it entrains the cloud and carries it away over a considerable distance.

The uniformizing of the particles is of utmost importance in order to break the surface tension of the particles and assure that the latter will become small enough to provide the desired dense coverage of leaves or the like which is necessary in order to obtain the full benefit of the present invention, in terms of the effectiveness of the deposited material upon pests or the like.

It will be understood that each of the elements described above, or two or more together, may also find a useful application in other types of construction differing from the types described above.

While the invention has been illustrated and described as embodied in an aerosol-particle dispenser and a turbine for dispensing aerosol particles, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the following claims.

1. A turbine for dispensing aerosol-particles, comprising a tubular body forming a passage which has an inlet end for a stream of gas, and an outlet end; a venturi mounted in said passage and having an extension which diverges in direction towards said outlet end; an outer hub mounted on said tubular body; a shaft mounted in said outer hub; an inner hub mounted for rotation on said shaft within said extension, defining with an inner circumferential wall surface thereof an annular clearance and carrying a plurality of angularly spaced blades which are located in said clearance; a tubular injector unit extending into said tubular body and having an open end positioned to discharge into said venturi, said unit having an outer turnable end portion exteriorly of said tubular body and provided with angularly spaced openings of different cross-sectional areas; a housing surrounding said outer end portion; a nipple communicating with said housing and adapted for connection to a source of substance to be dispensed; and an annular member mounted on said inner hub and having a central opening through which said shaft extends, said annular member having a serrated annular marginal portion axially spaced from and located opposite to said annular clearance.

2. A turbine for dispensing aerosol particles, comprising a hollow body having an inlet end for a stream of gas, and an outlet end; an element mounted in the interior of said hollow body and having a venturi-shaped passage through which the gas stream flows said venturi-shaped passage having an upstream converging section, a throat, and a downstream diverging section; means for injecting a dispensable substance into the gas stream for mixing therewith, including an injection tube having one end exteriorly of said hollow body and adapted for connection to a source of substance to be dispensed, and another end extending into said tubular body and having a discharge outlet in communication with said venturi-shaped passage upstream of said diverging section for distributing the substance throughout the gas stream due to the suction effect created by the gas stream accelerating through the throat of said venturi-shaped passage; a hollow extension member intermediate said venturi-shaped element and said outlet end for conducting the mixture in a path towards said outlet end; an outer hub mounted on said hollow body downstream of said extension member; a shaft having one end mounted in said outer hub, and another end; and a rotary inner hub mounted on the other end of said shaft within said extension member so as to define an annular clearance therewith, and having a plurality of angularly spaced rotary blades located in said clearance in the path of the mixture so as to turn the rotary inner hub about said shaft upon impingement on said blades by the mixture, said blades being operative for more finely distributing the substance throughout the gas stream prior to discharge out of said outlet end of said hollow body.

3. A turbine as defined in claim 2, wherein said hollow body is comprised of two tubular parts.

4. A turbine as defined in claim 2, wherein said extension member diverges in direction towards said outlet end.

5. A turbine as defined in claim 2; and further comprising means for regulating the flow of dispensable substance towards the gas stream, including an outer turnable end portion exteriorly of said injection tube and being provided with angularly spaced openings of different cross-sectional areas, a housing surrounding said outer end portion, and a nipple communicating with said housing and adapted for connection to a source of substance to be dispensed.

6. A turbine as defined in claim 5, wherein said nipple and said injection tube are elongated, and wherein said nipple is inclined relative to said injection tube so as to increase the turbulence of the flow of the substance to be dispensed through said injection means.

7. A turbine as defined in claim 2; and further comprising means for uniformizing the flow of the mixture, including an annular member downstream of said blades and having a plurality of teeth distributed in circumferential direction of said annular member, each adjacent pair of teeth bounding a channel through which the mixture flows prior to discharge out of said outlet end of said hollow body.

8. A turbine as defined in claim 7, wherein said annular member is mounted on said inner hub.

9. A turbine as defined in claim 7, wherein said annular member has a central opening through which said shaft extends.

10. A turbine as defined in claim 7, wherein said teeth are mounted on an annular marginal portion of said annular member and are axially spaced from and located opposite to said annular clearance.

11. A turbine as defined in claim 2, wherein said blades are of substantially triangular outline.

12. A turbine as defined in claim 2; and further comprising a pair of anti-friction bearings journalling said shaft in said inner hub.

* * * * *